US005365647A

United States Patent [19]

Senkow

[11] Patent Number: 5,365,647

[45] Date of Patent: Nov. 22, 1994

[54] ENGINE VALVE SERVICE APPARATUS

[75] Inventor: Anthony W. Senkow, Yale, Mich.

[73] Assignee: Chrysler Corporation, Highland Park, Mich.

[21] Appl. No.: 199,442

[22] Filed: Feb. 22, 1994

[51] Int. Cl.[5] ..................... B23P 19/04

[52] U.S. Cl. ..................... 29/220

[58] Field of Search ..................... 29/215, 219, 220, 267, 29/402.08, 426.5, 888.42, 888.46

[56] References Cited

U.S. PATENT DOCUMENTS

| | | | |
|---|---|---|---|
| 4,176,435 | 12/1979 | Castoe | 29/220 |
| 4,446,608 | 5/1984 | Johnson | 29/220 |
| 4,787,130 | 11/1988 | Hale et al. | 29/252 |
| 5,117,864 | 6/1992 | Byers | 29/213.1 |

*Primary Examiner*—Robert C. Watson
*Attorney, Agent, or Firm*—Kenneth H. MacLean

[57] ABSTRACT

In association with an overhead camshaft type internal combustion engine, apparatus to simultaneously pressurize all the combustion chambers and to maintain the valves in their closed positions while removing or installing valve springs. The apparatus has an elongated tubular inlet bar closed at one end and attached at the other end to a source of pressurized air. A flat base member is attached to the cylinder head so that openings therein are aligned over spark plug openings in the cylinder head. Short tubes extend from the base member to the tubular inlet bar to pass pressurized air to the combustion. The tubular inlet bar is also useful as a fulcrum for a lever used to compress the valve springs.

2 Claims, 2 Drawing Sheets

ENGINE VALVE SERVICE APPARATUS

BACKGROUND OF THE INVENTION

1. Field of the Invention

This invention relates to an apparatus for pressurizing engine combustion chambers or cylinders during service work on valve springs and the like. Specifically, for increased efficiency the apparatus pressurizes an entire bank of cylinders at one time.

2. Description of Related Art

It is known to pressurize individual combustion chambers to hold the associated intake and exhaust valves closed during service. This necessitates working on each cylinder individually which is inefficient. The subject apparatus increases efficiency by simultaneously pressurizing all the cylinders or combustion chambers. In addition, the apparatus provides a fulcrum for a lever-like device used to compress a valve spring.

In the Castoe U.S. Pat. No. 4,176,435, a device to compress an engine valve spring is disclosed. Also, see the similar device disclosed in Johnson U.S. Pat. No. 4,446,608. The Johnson patent also discloses the previous practice of pressurizing individual cylinders by introducing air through a spark plug opening (see Column 2, lines 46–50).

SUMMARY OF THE INVENTION

This invention is directed to a new and improved apparatus for pressurizing multiple engine cylinders during valve service. As a result, all the valve springs in a single bank of an internal combustion engine can be serviced at one time.

Also, the apparatus provides an elongated member or bar which serves as a fulcrum for a lever-like device to directly compress the springs as desired.

Other features and advantages will become more apparent from the following:

DETAILED DESCRIPTION OF AN EMBODIMENT

Figure 1:
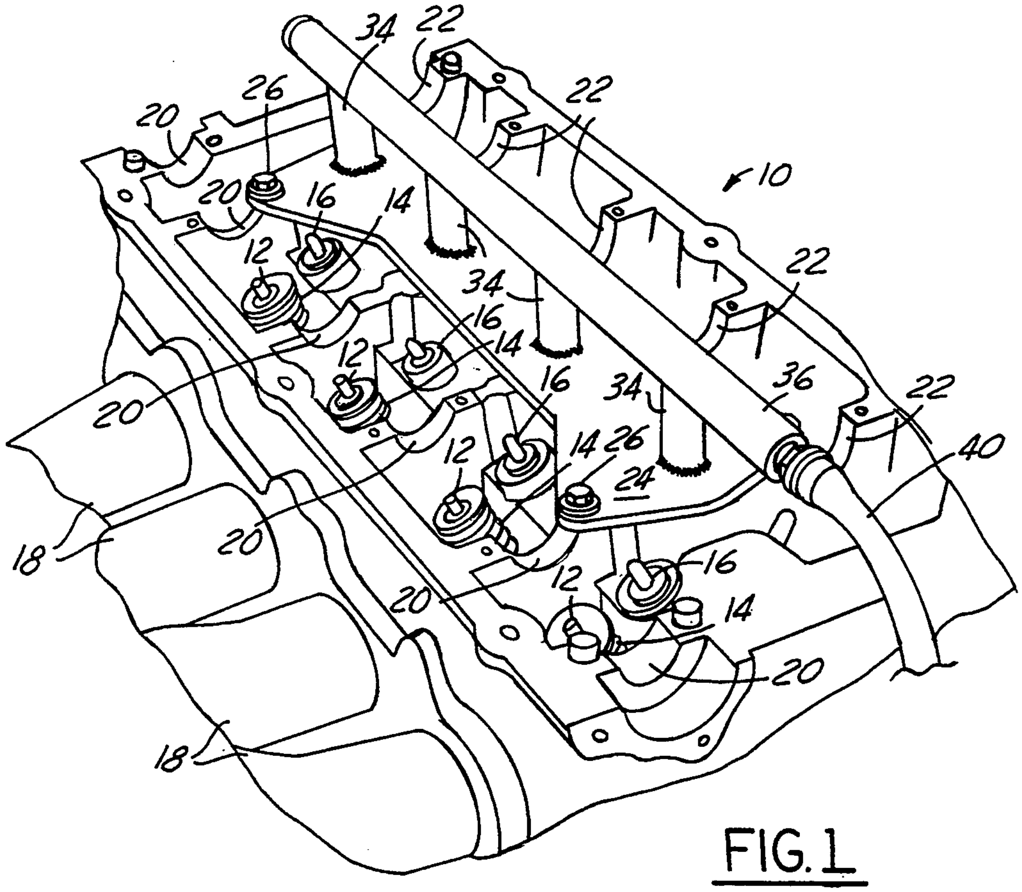
FIG. 1 is a perspective view of an engine's cylinder head showing the subject pressurization apparatus for introducing pressurized air into multiple combustion chambers.
Figure 2:
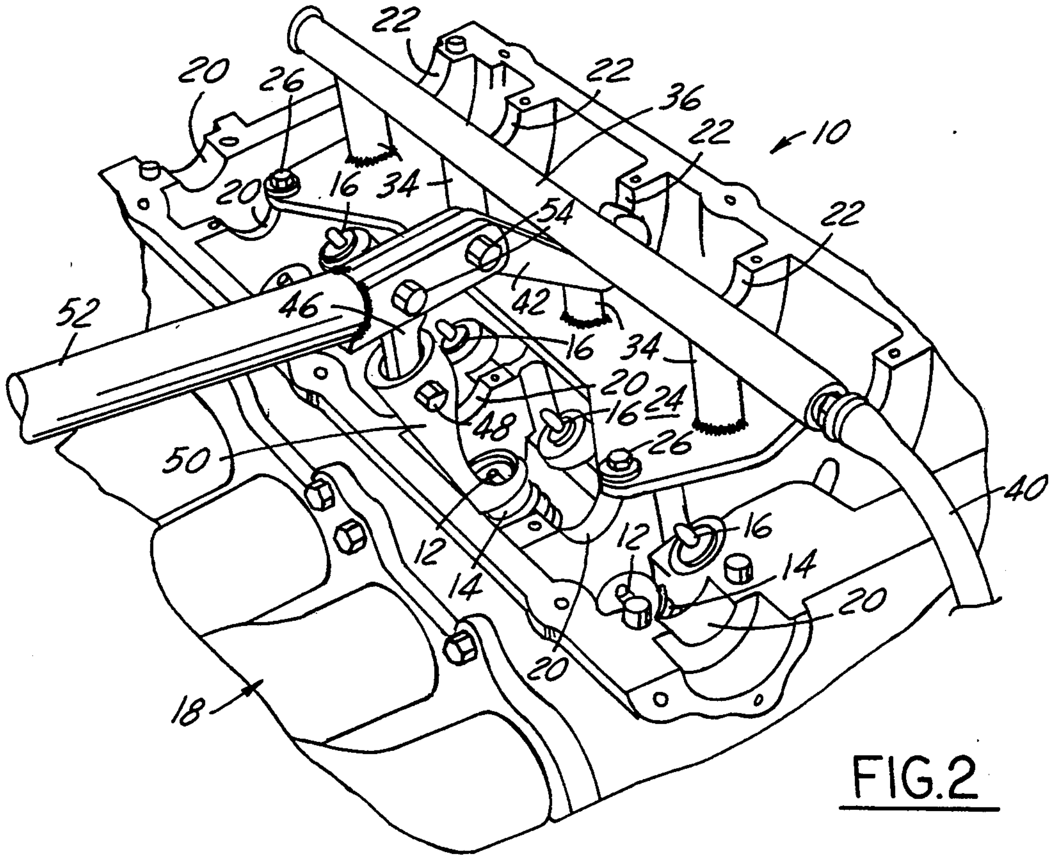
FIG. 2 is a perspective view similar to FIG. 1 but also showing an associated lever-like valve spring compressor used with the pressurization apparatus.

An engine cylinder head 10 is illustrated in the drawings. In FIGS. 1 and 2, the usual valve cover, camshafts, and rocker or lifter arms associated with the cylinder head 10 have been removed to facilitate servicing valves 12 and valve springs 14. Note the upper ends of lash adjusters 16. The particular engine cylinder head 10 which is illustrated is a dual overhead camshaft type head. In FIGS. 1 and 2, the leftward exhaust side of the cylinder head points toward the left. Hence, an exhaust manifold or header assembly 18 is visible. Bearing half-journals 20 are formed in the head to support the camshaft (not shown) associated with exhaust control. Likewise, the rightward pointing side of the cylinder head 10 is for controlling intake air and has half-journals 22 for supporting an intake camshaft (not shown).

Providing service for engine valves 12 and valve springs 14 is a common engine service operation. To avoid removal of the entire cylinder head 10, it is known to use pressurized air introduced through an individual spark plug hole to pressurize an associated combustion chamber to hold the intake and exhaust valves closed. Otherwise the valves can drop into the combustion chamber and require the head to be removed. However, it is inconvenient and inefficient to work on valve components for each combustion chamber separately. This requires that a pressure hose be attached and then detached to each cylinder sequentially. Also, as all the valve springs are usually serviced together, it is more efficient to work on them together. Accordingly, the subject pressurization apparatus allows a serviceman to pressurize all the cylinders of an engine bank simultaneously.

Figure 3:
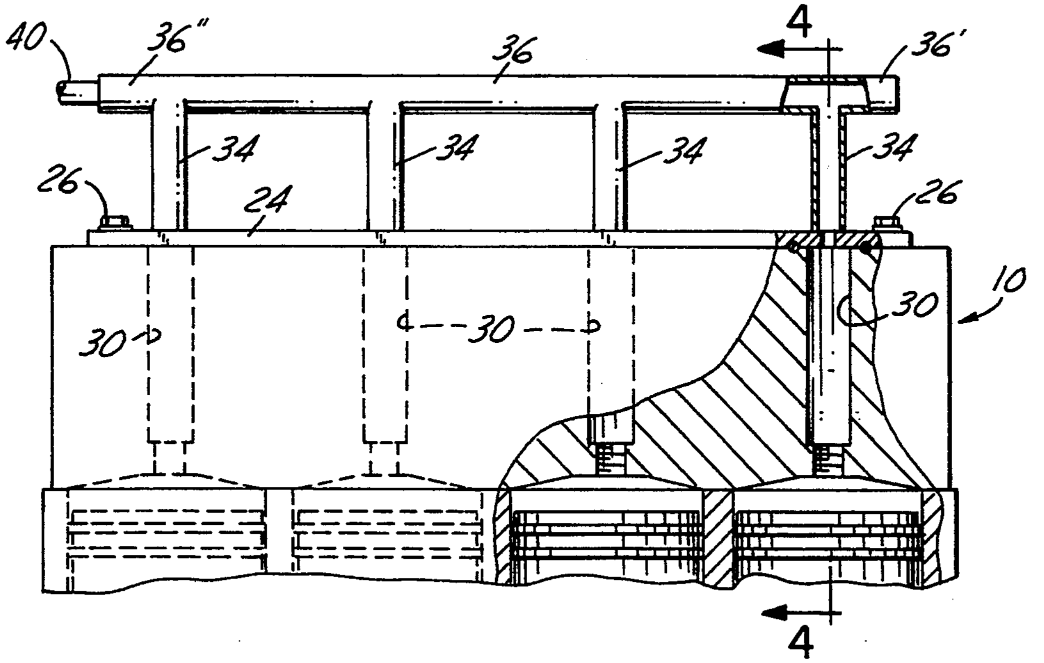
FIG. 3 is a side elevational view of a cylinder head with the subject pressurization apparatus broken away and partially sectioned to reveal internal air passages within the apparatus.
Figure 4:
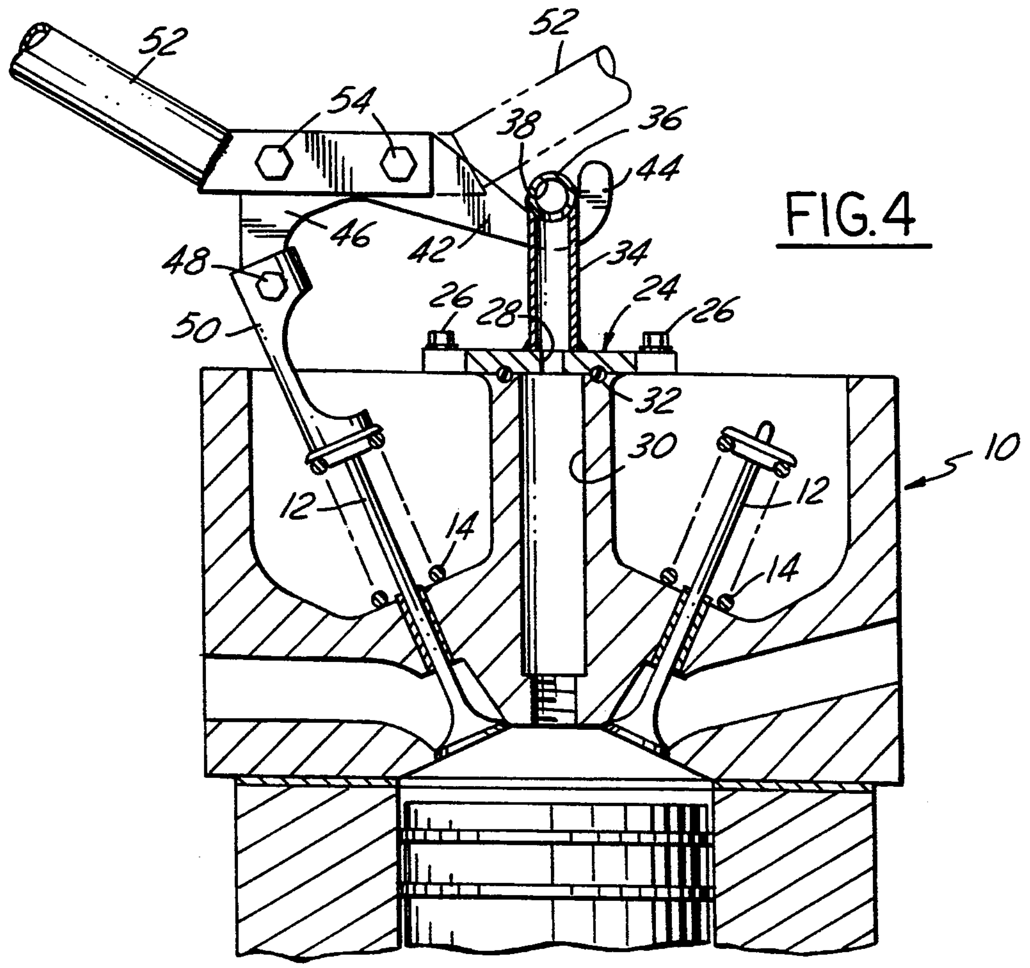
FIG. 4 is an end elevational and sectioned view of the cylinder head and pressurization apparatus taken along section line 4—4 in FIG. 3 and looking in the direction of the arrows.

Specifically, the pressurization apparatus includes a generally flat base member 24 adapted to be attached to the top surface of the cylinder head 10 by fasteners 26. As can be seen in FIGS. 3 and 4, this base member 24 has apertures 28 which are so positioned as to be superimposed over the head's spark plug holes 30. O-ring type seals 32 can be used to prevent leakage of air between member 24 and the head 10. A number equal to the spark plug holes of short inlet feed tubes 34 extend upward from each aperture 28 in the base 24. The upper end of each inlet tube is attached to a tubular bar member 36 with an interior wall 38. Bar 36 has a closed end portion 36′ and an air inlet end portion 36″. Pressurized air is introduced into end 36″ from an inlet hose 40 and pass through interior of the tubular bar member to the individual tubes 34. Next, the air enters the engines cylinders or combustion chambers through all the spark plug holes 30.

The result of pressurizing the engine cylinders by use of the apparatus disclosed above is that the valves 12 are forced against their valve seats so that the associated valve springs 14 can be removed/installed. For spring removal, a lever-like device or tool shown in FIG. 2 is used. The tool has an active or engaging portion 42 which is formed with a hook-configured end formation 44 adapted to engage the bar member 36. An arm 46 extends downward from the opposite end of active portion 42. Arm portion 46 is attached by a fastener 48 to the upper end of a generally cylindrical and tubular member 50.

As is already known in the engine servicing art, a tubular member such as member 50 can be used to exert a selective force on a valve spring and specifically the valve's retainer member. By this, the spring itself is axially compressed while the valves are maintained immobile. This permits valve spring retainer means to be disengaged from the upper end of the valve so that the valve spring can then be released and removed. Obviously, a valve spring and retainer can be reassembled to the cylinder head by reversing the procedure. The downward force on the member 50 is provided by manually actuating a lever 52. Lever 52 is attached to active portion 42 by removable fasteners 54. Removal of fasteners 54 allow the lever 52 to be turned around and reattached in the alternate position 52′, if desired.

While a preferred embodiment of the apparatus and procedure for valve service has been shown and described, other embodiments will now become apparent to those skilled in the art. Accordingly, this invention is not to be limited to what is shown and described but by the following claims.

What is claimed is:

1. To service valve springs and associated valve components in an engine's overhead cam type cylinder head with an opening leading to each combustion chamber, normally for installation of a spark plug, an apparatus for simultaneously pressurizing all the combustion chambers, comprising: a generally flat base member with openings therethrough, said openings being arranged in alignment with the cylinder head's spark plug openings when said base member is attached to the cylinder head; an elongated tubular bar member extending in spaced relationship along said openings in said base member, said bar member having a closed end portion and an inlet end portion adapted to selectively receive pressurized air; a short feed tube associated with each openings in said base member for connecting each opening with the bar member; seal means interposed between the cylinder head and said pressurization apparatus about each opening in said base member whereby pressurized air is routed from the interior of said bar member into the combustion chambers through the head's spark plug openings.

2. To service valve springs and associated valve components in an engine's overhead cam type cylinder head with an opening leading to each combustion chamber, normally for installation of a spark plug, an apparatus for simultaneously pressurizing all the combustion chambers, comprising: a generally flat base member with openings therethrough, said openings being arranged in alignment with the cylinder head's spark plug openings when said base member is attached to the cylinder head; an elongated tubular bar member extending in spaced relationship along said openings in said base member, said bar member having a closed end portion and an inlet end portion adapted to selectively receive pressurized air; a short feed tube associated with each openings in said base member for connecting each opening with the bar member whereby pressurized air is routed from the interior of said bar member into the combustion chambers through the head's spark plug openings; and lever means adapted to engage said bar member for use as its fulcrum to exert a force upon an associated valve spring of the cylinder head.

* * * * *